United States Patent [19]

Draper et al.

[11] Patent Number: 5,924,096

[45] Date of Patent: Jul. 13, 1999

[54] DISTRIBUTED DATABASE USING INDEXED INTO TAGS TO TRACKS EVENTS ACCORDING TO TYPE, UPDATE CACHE, CREATE VIRTUAL UPDATE LOG ON DEMAND

[75] Inventors: Stephen PW Draper, Basingstoke, United Kingdom; Dale A Lowry, Provo, Utah

[73] Assignee: Novell, Inc., Orem, Utah

[21] Appl. No.: 08/950,575

[22] Filed: Oct. 15, 1997

[51] Int. Cl.[6] .................................................. G06F 17/30
[52] U.S. Cl. ................................ 707/10; 707/2; 707/101; 707/104; 707/201; 707/203; 707/511
[58] Field of Search .................................... 707/1, 2, 3, 4, 707/5, 6, 7, 8, 10, 100, 102, 103, 200, 201, 202, 203, 204, 501, 511, 513, 514, 9, 101, 104

[56] References Cited

U.S. PATENT DOCUMENTS

| | | | |
|---|---|---|---|
| 4,432,057 | 2/1984 | Daniell et al. | 707/8 |
| 4,961,139 | 10/1990 | Hong et al. | 707/1 |
| 5,113,519 | 5/1992 | Johnson et al. | 707/201 |
| 5,251,316 | 10/1993 | Anick et al. | 707/101 |
| 5,276,871 | 1/1994 | Howarth | 707/201 |
| 5,325,524 | 6/1994 | Black et al. | 707/10 |
| 5,347,653 | 9/1994 | Flynn et al. | 707/203 |
| 5,394,394 | 2/1995 | Crowther et al. | 370/392 |
| 5,404,505 | 4/1995 | Levinson | 707/10 |
| 5,434,994 | 7/1995 | Shaheen et al. | 707/201 |
| 5,448,727 | 9/1995 | Annevelink | 707/101 |
| 5,499,367 | 3/1996 | Bamford et al. | 707/8 |
| 5,530,851 | 6/1996 | Fortier | 707/2 |
| 5,530,855 | 6/1996 | Satoh et al. | 707/201 |
| 5,535,386 | 7/1996 | Wang | 707/203 |
| 5,551,027 | 8/1996 | Choy et al. | 707/201 |
| 5,745,899 | 4/1998 | Burrows | 707/102 |
| 5,794,253 | 8/1998 | Norin et al. | 707/203 |
| 5,796,999 | 8/1998 | Azagury et al. | 707/10 |
| 5,806,074 | 9/1998 | Sounder et al. | 707/201 |
| 5,806,075 | 9/1998 | Jain et al. | 707/201 |

FOREIGN PATENT DOCUMENTS

| | | | |
|---|---|---|---|
| 0 663 640 A1 | 7/1995 | European Pat. Off. | G06F 17/30 |
| WO 97/04391 | 2/1997 | WIPO | G06F 11/14 |

OTHER PUBLICATIONS

"BEA TUXEDO and the Component Software Model", Unknown, http://tuxedo.novell.com/products/tuxedo/tuxwp_pm/tuxwp_pm2.htm, No later than Jul. 3, 1997, pp. 1–6.

"BEA TUXEDO Architecture", Unknown, http://tuxedo.novell.com/products/tuxedo/tuxwp—pm/tuxwp_pm 4.htm, No later than Jul. 3, 1997, pp. 1–9.

"Distributed Operating Systems", A. S. Tanenbaum, *Prentice Hall*, 1995, Title & pp. 268–272.

"Programming a Distributed Application: The BEA TUXEDO® Approach", Unknown, http://tuxedo.novell.com/products/tuxedo/tuxwp_pda/tuxwp_pda.htm, May, 1996, pp. 1–11.

"NetWare 4 for Professionals", D. Bierer et al., *New Riders Publishing*, 1993, Title and pp. 380–382.

"Novell's® Complete Encyclopedia of Networking", W. Feibel, *Novell Press*, 1995, pp. 837–838.

"Providing High Availability Using Lazy Replication", R Ladin et al., *ACM Transactions on Computer Systems*, vol. 10, No. 4, Nov. 1992, pp. 360–391.

"A Snapshot Differential Refresh Algorithm", B. Lindsay et al., *ACM SIGMOD Record*, vol. 15, No. 2, 1986, pp. 53–60.

*Primary Examiner*—Wayne Amsbury
*Assistant Examiner*—Srirama Channavajjala
*Attorney, Agent, or Firm*—Computer Law ++

[57] ABSTRACT

Methods and systems are provided for synchronizing local copies of a distributed database, such as a master copy and a partial copy stored in a replica or in a cache. Each data item in the database has an associated timestamp or other tag. An index into the tags in maintained. The tag index may be used to create an event list to reduce the time and bandwidth needed to synchronize the local copies. The tag index may also be used to create a virtual update log, thereby removing the need to maintain one or more physical logs recording the history of the copies.

32 Claims, 4 Drawing Sheets

DISTRIBUTED DATABASE USING INDEXED INTO TAGS TO TRACKS EVENTS ACCORDING TO TYPE, UPDATE CACHE, CREATE VIRTUAL UPDATE LOG ON DEMAND

FIELD OF THE INVENTION

The present invention relates to distributed database computer systems, and more particularly to distributed database systems which use indexed tags to track events according to type, to update a cache of database data items, to construct an update log on demand, and to provide other capabilities.

TECHNICAL BACKGROUND OF THE INVENTION

The potential advantages of distributed database systems are well-known. As computing power becomes more widely available at lower prices, the most cost-effective approach to database implementation often involves harnessing many connected processors together into one large system. Some database uses, such as email or document management capabilities, are inherently driven toward distributed implementations. Distributing a database may also improve reliability, since the failure of a single processor in a distributed system will not necessarily bring to a halt all use of the database. As a result, databases are often distributed among connectable nodes in a network, with each node receiving a replica of part or all of the database.

However, distributing database replicas creates the problem of maintaining consistency, at least to some degree, between the replicas. Steps must be taken to synchronize the replicas so that a database query using one replica of the database tends (or in some cases, is guaranteed) to give the same result as a query using another replica of the database. Aspects of database transaction synchronization are discussed in commonly owned copending application Ser. No. 08/700,487 filed Sep. 3, 1996. Aspects of clash handling during synchronization are discussed in commonly owned copending application Ser. No. 08/700,489 filed Sep. 3, 1996. Commonly owned copending application Ser. No. 08/700,490 filed Sep. 3, 1996 discusses compression of "physical" update logs, namely, logs which are created and maintained more-or-less continuously during database usage. These discussions are incorporated herein by reference.

Caching part or all of a replica in memory, to reduce disk accesses and/or network traffic, may dramatically reduce the response time to a query. However, caching complicates synchronization by increasing both the number and kind of replicas present in the system. Both cached replicas and replicas stored on disk must be updated to maintain adequate consistency throughout the database. In addition, decisions must be made about when to use the cache and when to use the disk in response to a database query or update operation.

One synchronization method sends a list of cached database object identifiers and corresponding timestamps or sequence numbers from the caching node to a master node which holds a master replica. The master node compares this list with the list of objects in the master replica, compares the timestamps of objects found in both replicas, and then uses a physical update log to generate a list of update operations. The list of update operations is sent back to the caching node and applied to the cached database objects, thereby synchronizing the cached replica with the master replica.

A major drawback of this synchronization method is that some object identifiers and timestamps may be transmitted even when the cached and master copies of the objects in question are already synchronized. This wastes bandwidth, memory, and processing cycles, particularly as the number of cached objects grows. Another drawback is that flexible caching policies are hard to implement because all updates are treated the same way by all caches.

Using a physical update log to track operations on the master replica also has disadvantages. Logs can be quite large if they are not compressed, since each log must contain at least one entry (recording object creation) for each object in the replica. Even if log compression is used, physical update logs may require substantial disk storage space on the node. A synchronization checkpoint must also be maintained in the log for each other replica that can synchronize with the master replica. These checkpoints prevent a later update from being merged into an earlier one when the checkpoint falls between the two updates. They also reduce scalability in the number of caching replicas.

It would therefore be an advancement in the art to provide an improved method and system for distributed database caching to reduce the amount of unnecessary data sent between nodes.

It would be an additional advancement to provide such a method and system which support caching policies that treat specified updates differently from other updates.

It would also be an advancement to provide such a method and system which create update logs on demand rather than continuously.

Such a method and system for distributed databases are disclosed and claimed herein.

BRIEF SUMMARY OF THE INVENTION

The present invention provides a method and system for using indexed tags in a distributed database. "Tags" include timestamps, version numbers, sequence numbers, update reference numbers, transaction counters, and other means of determining the relative order of two operations on a database replica. "Indexes" include hash tables, balanced trees, and other structures that allow relatively rapid and direct access to a specific item in a large collection of items, based on one or more key values.

Both conventional systems and systems according to the invention may use indexes into database objects and records. In conventional systems, the indexed items contain data supplied by and/or sought by database users. This may also be true in systems according to the invention, but the invention also provides indexes into tags. To the best knowledge of the inventors, conventional systems do not index tags or use indexed tags to provide the capabilities disclosed here.

One embodiment of a computer system according to the invention includes a distributed database of objects or other data items. For instance, the database may contain records, since objects and records are interchangeable with regard to most aspects of the invention. The database is divided into local copies, such as replicas or partitions. A tag is associated with each data item in a local copy. An update means is provided for updating the tag for a given data item whenever a database operation is performed on the given item, such that the tag is no smaller than the largest tag currently in the local copy. An index into the tags for the local copy is also maintained.

Database update operations (also known as "events") are categorized by type, and the index into the tags can be used to quickly determine what events occurred after the event that corresponds to a given tag value. The index can be used to efficiently create a list of recent events, which can then be sent to a master node to obtain the information needed to update a local cache of database objects or records. Basing the update on the list of recent events reduces the amount of unnecessary data sent between nodes because information about items that are still synchronized need not be transmitted. The cache may also be updated periodically by a cache manager, regardless of any requests to access the cache.

Categorizing operations by type allows the system to use a variety of caching policies which treat certain operations differently from other operations. For instance, one cache may add a data item to the cache each time an add event occurs, while another cache only changes the cache when a modify event occurs.

The index into the tags can also be used to create a "virtual" update log on demand, reducing or eliminating the need for continually maintaining a physical data log. This dynamically created log can be used to synchronize two copies of the database, and to handle clashes during synchronization, in much the same way as a physical log but without all the drawbacks of physical logs.

Each data item's tag may also be tailored to identify which copy of the database the data item is located in, so that updates to a given local copy can be grouped during synchronization. This promotes locality of reference, which leads to better caching performance. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to a method and system for using indexed tags in a distributed database. The invention may be used with local area networks, wide area networks, and/or the Internet. "Internet" as used herein includes variations such as a private Internet, a secure Internet, a value-added network, a virtual private network, an extranet, or an intranet. The computers connected by the network may be workstations, laptop computers, disconnectable mobile computers, servers, mainframes, or a combination thereof. The network may include one or more LANs, wide-area networks, Internet servers and clients, intranet servers and clients, peer-to-peer nodes, or a combination thereof.

Figure 1:
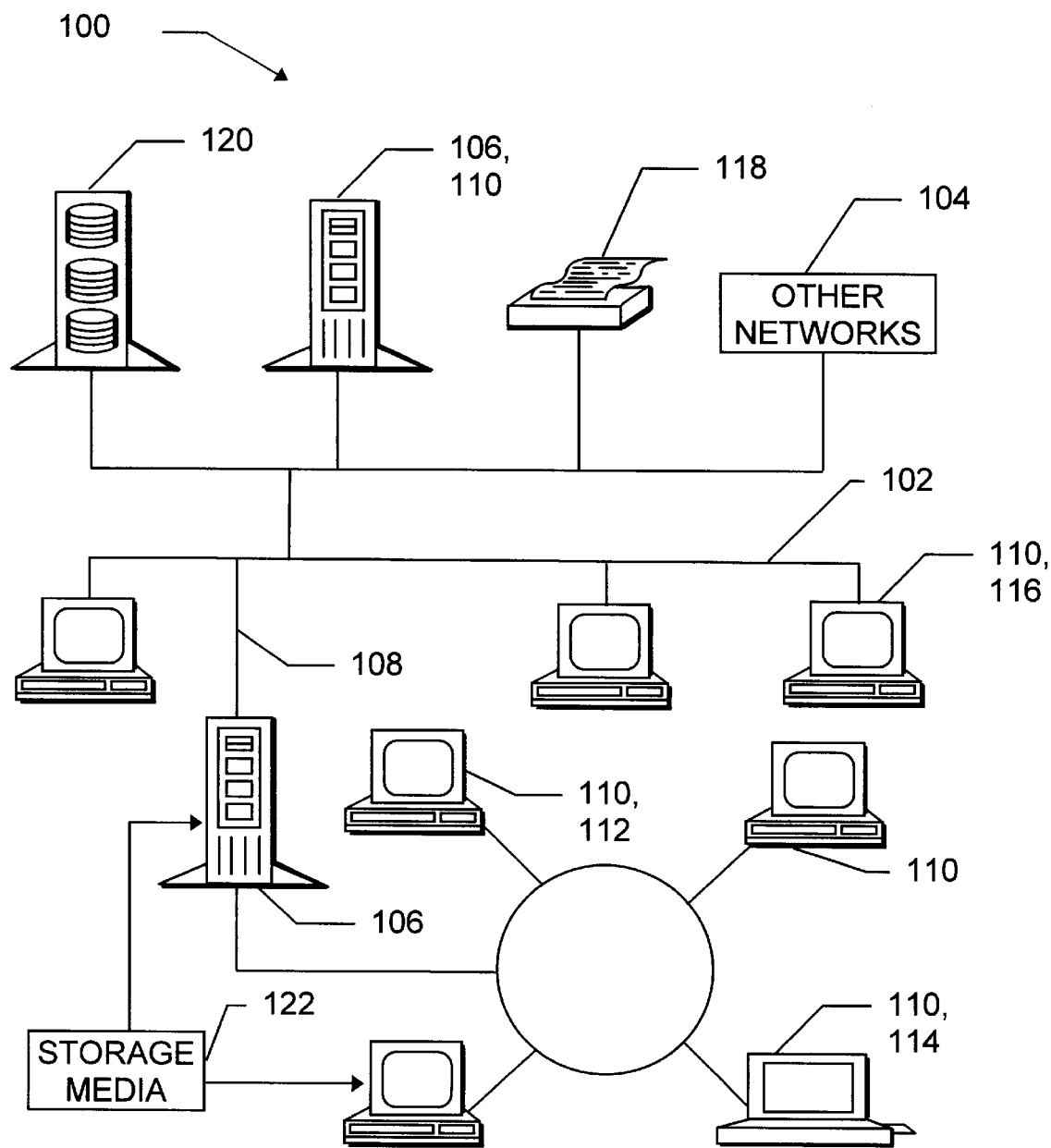
FIG. 1 is a diagram illustrating a network of computers which is among the many systems suitable for use with the present invention.

One of the computer systems suited for use with the present invention is indicated generally at 100 in FIG. 1. In one embodiment, the system 100 includes Novell NetWare® network operating system software (NETWARE is a registered trademark of Novell, Inc.) and Novell Directory Services software. In alternative embodiments, the system 100 includes NetWare Connect Services, VINES, TCP/IP, Windows NT, Windows 95, LAN Manager, and/or LANtastic network operating system software and/or an implementation of a distributed hierarchical partitioned object database according to the X.500 protocol or another directory service protocol such as the Lightweight Directory Access Protocol (VINES is a trademark of Banyan Systems; NT, WINDOWS 95, and LAN MANAGER are trademarks of Microsoft Corporation; LANTASTIC is a trademark of Artisoft). The system 100 may include a local area network 102 which is connectable to other networks 104, including other LANs or portions of the Internet or an intranet, through a gateway or similar mechanism.

The system 100 includes several servers 106 that are connected by network signal lines 108 to one or more network clients 110. The servers 106 and network clients 110 may be configured by those of skill in the art in a wide variety of ways to operate according to the present invention. The servers 106 may be configured as Internet servers, as intranet servers, as directory service providers or name servers, as software component servers, or as a combination thereof. The servers 106 may be uniprocessor or multiprocessor machines. The servers 106 and clients 110 each include an addressable storage medium such as random access memory and/or a non-volatile storage medium such as a magnetic or optical disk.

Suitable network clients 110 include, without limitation, personal computers 112, laptops 114, workstations 116, and dumb terminals. The signal lines 108 may include twisted pair, coaxial, or optical fiber cables, telephone lines, satellites, microwave relays, modulated AC power lines, and other data transmission "wires" known to those of skill in the art. In addition to the network client computers 110, a printer 118 and an array of disks 120 are also attached to the system 100. A given computer may function both as a client 110 and as a server 106; this may occur, for instance, on computers running Microsoft Windows NT software. Although particular individual and network computer systems and components are shown, those of skill in the art will appreciate that the present invention also works with a variety of other networks and computers.

The servers 106 and the network clients 110 are capable of using floppy drives, tape drives, optical drives or other means to read a storage medium 122. A suitable storage medium 122 includes a magnetic, optical, or other computer-readable storage device having a specific physical substrate configuration. Suitable storage devices include floppy disks, hard disks, tape, CD-ROMs, PROMs, random access memory, and other computer system storage devices. The substrate configuration represents data and instructions which cause the computer system to operate in a specific and predefined manner as described herein. Thus, the medium 122 tangibly embodies a program, functions, and/or instructions that are executable by the servers 106 and/or network client computers 110 to perform database management with indexed tags substantially as described herein. Suitable software for implementing the invention is readily provided by those of skill in the art using the teachings presented here and programming languages such as Java, Pascal, C++, C, assembly, firmware, microcode, and/or other languages.

Figure 2:
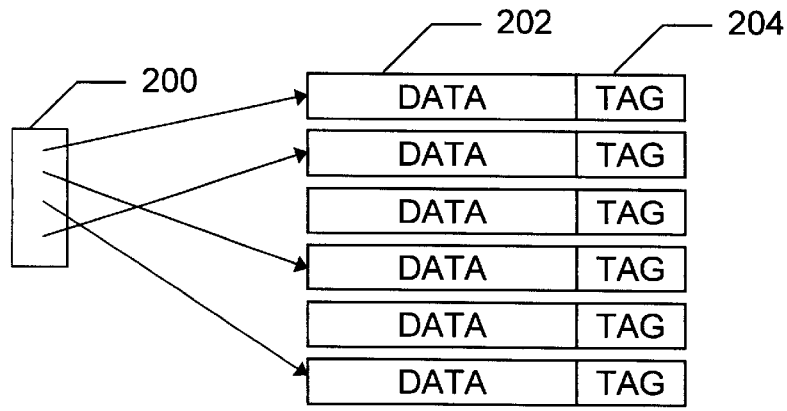
FIG. 2 is a diagram illustrating the indexing of data items in a conventional system.

FIG. 2 illustrates a conventional database system which includes a data index 200 into a set of data items 202. The data items 202 may include objects, records, or other collections of data values. The data items 202 are principally supplied by and/or sought by database users, as opposed to being principally used internally for administration, organization, and/or manipulation of the database. The data items 202 may be organized in a hierarchical database, a relational database, or another organization.

The data index 200 includes one or more hash tables, balanced trees, and/or other structures that allow relatively rapid and direct access to a specific data item 202 or set of data items 202 based on one or more key data values. In an inventory or sales database, for instance, keys such as part number or item name could be used to index data items 202 containing information such as cost, price, and current availability.

Each data item 202 has an associated tag 204 (in alternative embodiments, only selected data items are tagged). Each tag 204 value corresponds to an event in the history of the associated data item 202, such as the most recent update to the data item 202. The tags 204 may be designed to allow recovery of earlier versions of the data item 202. The tags 204 may also allow the system to determine which copy of a data item 202 is more recent, so that the most recent data can be propagated during synchronization.

Tags 204 are typically restricted to internal use. They may be accessed by administrators but are seldom or never seen by most database user. Suitable tags 204 include timestamps, version numbers, sequence numbers, update reference numbers, transaction counters, and other means of determining the relative order of operations on data items 202. A transaction counter guarantees ordering of events and supports synchronization because the counter is received by a cache or other database copy from a master database copy.

Figure 3:
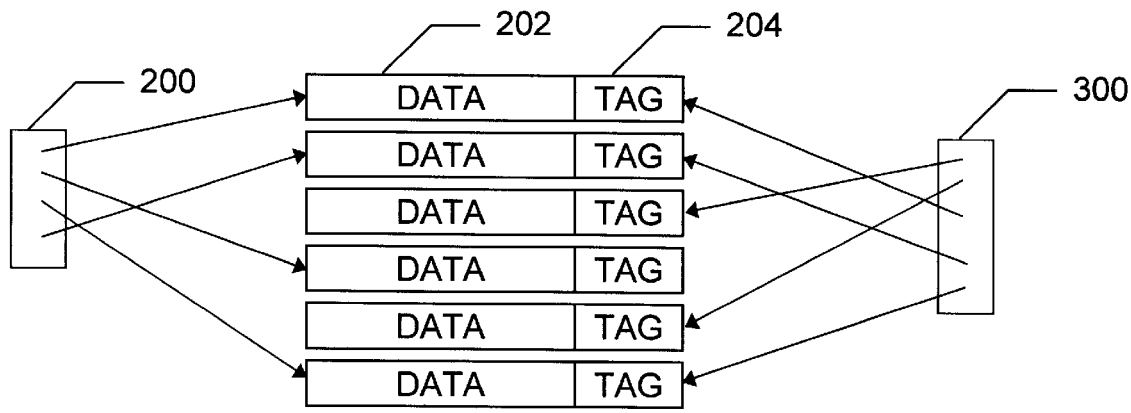
FIG. 3 is a diagram illustrating generally the indexing of data items and the indexing of tags in a system according to the present invention.
Figure 4:
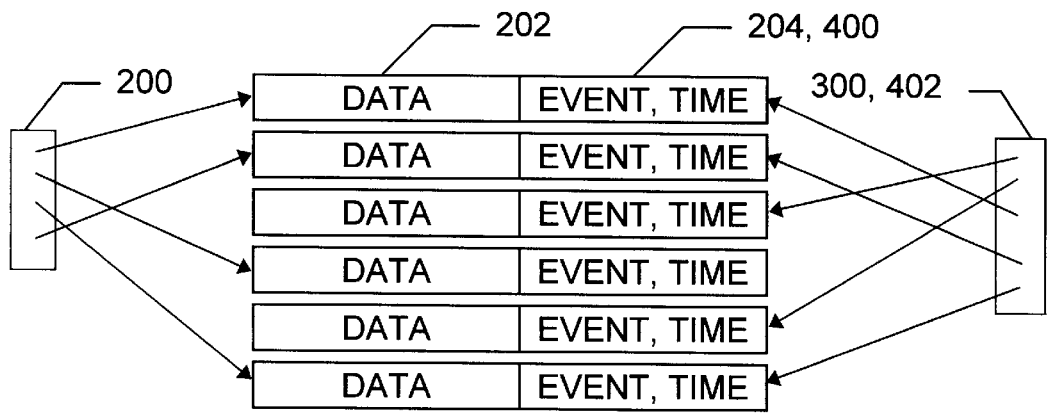
FIG. 4 is a diagram illustrating in greater detail the indexing of data items and tags in a system according to the present invention

FIGS. 3 and 4 show systems according to the present invention. In the conventional system shown in FIG. 2, the data index 200 is keyed on data item 202 values, not on tag 204 values. By contrast, the tags 204, 400 in the inventive systems are indexed for rapid access. Systems according to the invention may use data indexes 200 into database items 202 just as in conventional systems. However, in such cases the invention expands indexing to include indexes 300, 402 into the tags 204, 400.

Suitable tag indexes 300, 402 include hash tables, balanced trees, and/or other structures that allow relatively rapid and direct access to a specific tag 204, 400 based on one or more key tag values. For tags such as the tags 400 which include a timestamp, a key tag value may be a timestamp value, such as the timestamp corresponding to a synchronization of master and slave replicas. For tags such as the tags 400 which include an event identifier, a key tag value may identify an event or a set of events, such as the creation or modification of the corresponding data item 202.

The tags 400, which contain an event identifier and a timestamp, are just one of many possible tags 204. In alternative embodiments, a tag 204 contains a version number, sequence number, update reference number or other value that allows the system to determine the relative order of operations on data items 202. The optional event identifier in the tag 204 may identify events such as the addition, modification, deletion, replication, security or permissions modification, and/or reading of a data item 202.

For convenience, the tags 204, 400 are shown adjacent corresponding data items 202. This does not require physical adjacency. In some embodiments, the tags 204, 400 are stored separately from their corresponding data items 202. In addition, the correspondence between tags 204, 400 and data items 202 need not be a simple one-to-one correspondence. In one embodiment, each data item 202 (such as each data object) is associated with a set of tags 204, 400, not with just one tag 204, 400.

Moreover, additional indexes 300 may be used. For instance, in one embodiment an index 300 provides rapid access to the tags 204, 400 by using data object 202 identifiers to index a table of tags 204, 400. This allows rapid updating of the tags 204, 400 when the data objects 202 are changed, and in particular, allows rapid tag updates when the security characteristics of data objects are changed.

Figure 5:
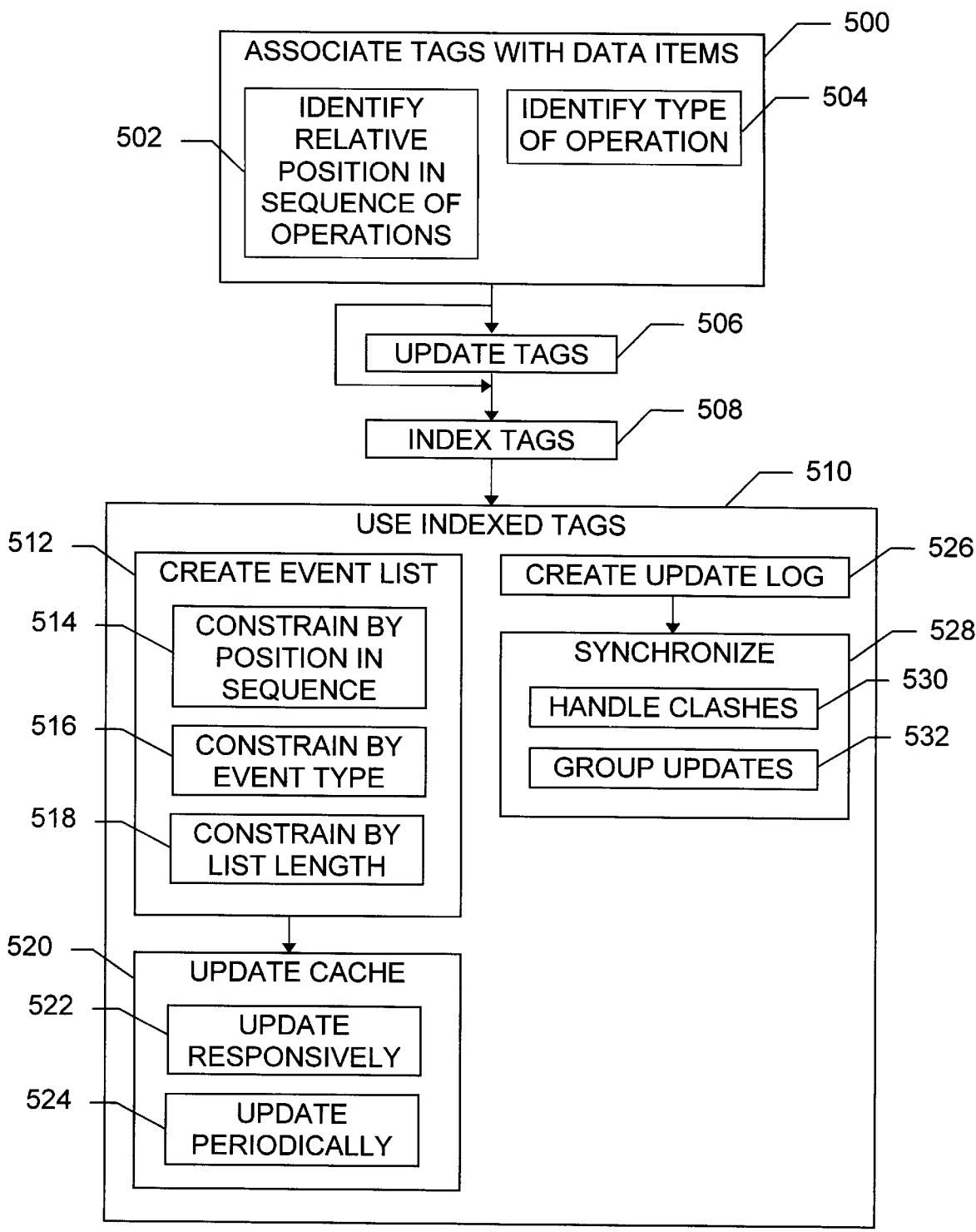
FIG. 5 is a flowchart illustrating methods of the present invention.

FIG. 5 illustrates several methods of the present invention for managing a distributed database of objects, records, or other data items 202. During a tagging step 500, a tag 204 is associated with at least some of the data items 202 in the database. The tag 204 may be created and associated with the data item 202 when the data item 202 is initially added to the database, or the tag 204 may be added later.

The tag 204 includes a timestamp, version number or other means of identifying the relative position of the associated data item operation in the sequence of operations on data items 202; this tag component is placed in the tag 204 during a step 502. The tag 204 optionally also contains an event identifier which distinguishes between different types of events on data items 202; the event identifier is placed in the tag 204 during a step 504.

During an updating step 506, the tag for a given data item 202 is updated to reflect the fact that a database operation has been (or soon will be) performed on the given data item 202. The updating step 506 may include steps similar to the steps 502, 504, for updating the timestamp or version and for updating the event identifier, respectively.

Those of skill in the art will understand that the updating step 506 need not be performed for every possible database operation, but rather only for those operations being tagged and managed according to the invention. Operations performed are not necessarily identified by the event identifier values. For instance, in one embodiment, read operations are performed but not tracked, while write, security modify, and delete operations performed are tracked and are each identified by separate event identifier values. In this embodiment the updating step 506 is not done after a read operation, but tags 204 are updated to reflect write, security modify, and/or delete operations.

In one embodiment, the tag 204 for a given data item 202 is updated during the step 506 to reflect the operation on that data item 202 such that the tag 204 in question is no smaller than the largest tag currently in the local copy of the database. That is, the tag values form an increasing sequence, with the larger tag value(s) corresponding to the most recently performed operation(s). For clarity of discussion, reference is made principally to increasing sequences, but those of skill in the art will recognize that a decreasing sequence could also be used, since the two approaches (increasing or decreasing) are readily interchangeable.

A tag-indexing step 508 maintains a tag index 300 into the tags 204 for at least the local copy of the database. Tags 204 may be indexed according to timestamp or other tag values in the increasing sequence. If the tags 204 contain event identifiers, the tags 204 may also be indexed on the event identifiers, either according to individual event types (e.g., create, write data, write permissions, delete, rename) or according to sets of event types (e.g., data-item-value-modifying events versus data-item-location-modifying events).

The indexed tags are used during a step 510. For purposes of illustration, two uses of the indexed tags are shown in FIG. 5: updating a cache and synchronizing replicas. These uses are not mutually exclusive, and other uses of the indexed tags will also be apparent to those of skill in the art.

With regard to cache updates, an event list is created during a step 512. Each element in the event list contains enough information to allow a cache manager to recreate the corresponding event, in order to duplicate the effect of the event and thus update the cache. Rather than sending all information on all operations between a computer holding a cache (such as the client 110 in FIG. 1) and a computer holding the master copy of cached data items 202 (such as the server 106), the present invention allows a cache manager to rapidly create a list containing only specified events. This reduces bandwidth usage and processing time, making it possible to update the cache more frequently.

Events may be selected in various ways for membership in the event list. Three constraining steps 514, 516, 518 are shown in FIG. 5; other suitable constraints will also be known to those of skill in view of the teachings herein. Constraining steps may be applied individually or in combination. Explicit constraining steps may also be omitted. For instance, a constraint may be implicit in the associating step 500. Constraining steps may be implemented through filtering at either the tag index 300 level or the list level. It is preferred that filtering be done at the tag index 300 level when possible, so that links from the tag index 300 to the to the tags 204 are followed only when the tag 204 is likely to meet the constraint(s).

A step 514 constrains event list membership using the timestamp, version number or similar tag component discussed in connection with step 502. For instance, the list may contain only events that occurred after a specified event, or only events that occurred before a specified event, or only events that occurred between two specified events. In particular, the tag index 300 can be used to quickly determine what events occurred after the most recent cache update.

If database operations are categorized by event type as discussed in connection with the step 504, a constraining step 516 may also be applied to limit list membership by event type. For instance, the step 516 may ensure that only events which modify data item 202 contents are placed in the event list. Constraining steps 514 and 516 can also be combined to produce a list of recent events constrained by event type; an event appears in the list only if the event is of one or more selected event types and is also sufficiently recent.

To reduce memory, bandwidth, and per-update processing requirements, a step 518 may constrain the event list by limiting the maximum number of events placed in the list. This may be combined with other constraints to produce, for instance, a list of the ten most recent changes to data item 202 permissions.

During a step 520, the cache of data items 202 is updated using the event list. As illustrated by step 522, the cache may be updated in response to a request to access the cache. As illustrated by step 524, the cache may also be updated periodically by a cache manager, regardless of any requests to access the cache. The two approaches may also be combined, so the cache is updated at least as frequently as some predetermined period and is updated more frequently when access requests occur more frequently than the period.

Figure 6:
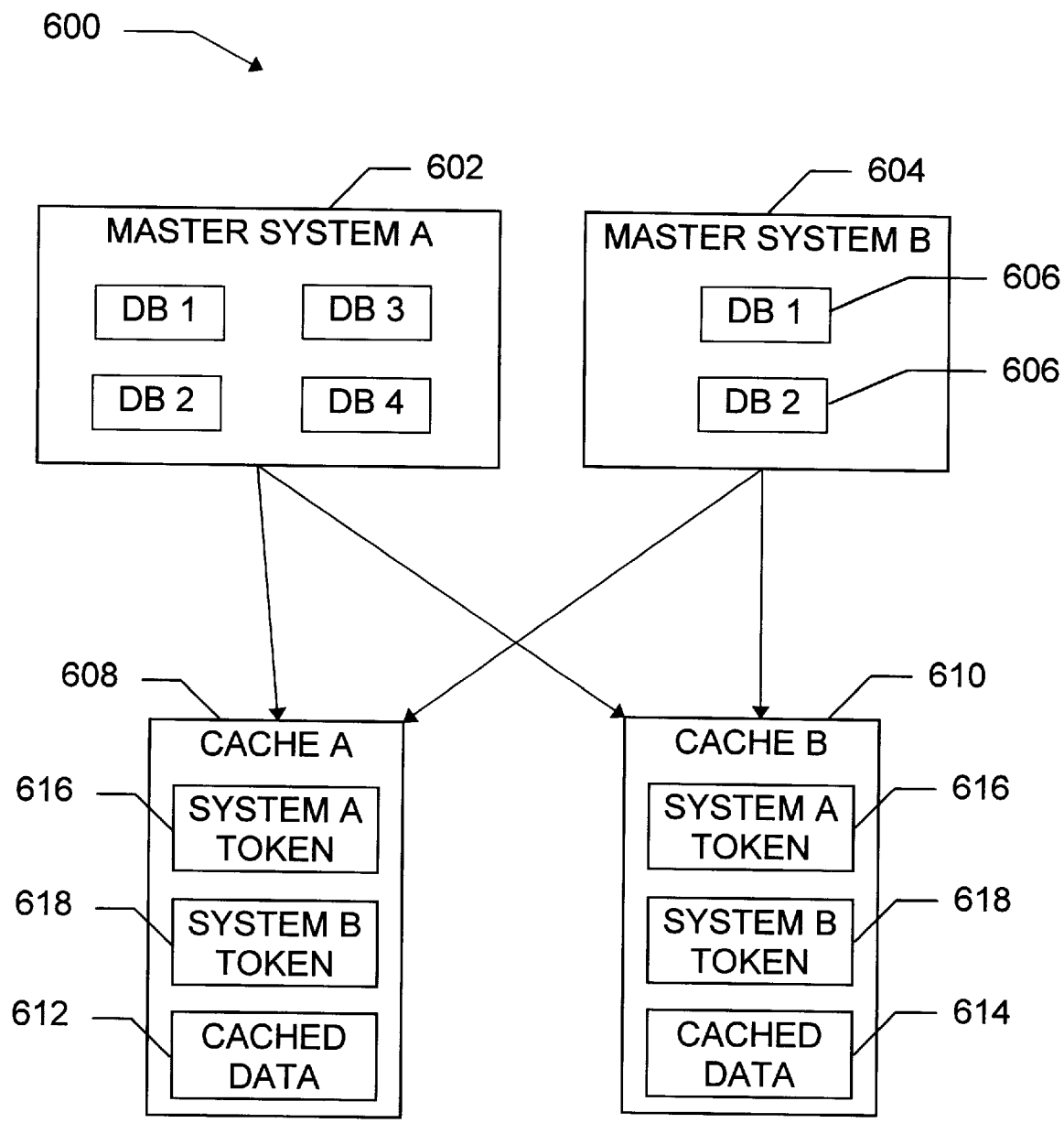
FIG. 6 is a diagram further illustrating a portion of an inventive system such as the system shown in FIG. 1.

To more fully illustrate the benefits of this method for updating caches, consider a system such as the system 600 shown in FIG. 6. The system 600 includes a master system 602 denoted "A" and a second master system 604 denoted "B". Each master system could be implemented using a server 106 and replicated database software such as NDS software, GroupWise software, or other software which uses a master copy of data items 202 to promote consistency among distributed copies of the data items 202. The data items 202 are stored in database replicas 606.

The system 600 also includes two client caches 608, 610, which reside on clients 110. Each cache 608, 610 contains cached data 612, 614, respectively, which includes copies of at least some of the data items 202. The cached data 612, 614 may be in the same format as the replicas 606, but this is not required for use of the invention. For instance, one database format could be used on the master systems 602, 604 while a different database format (even from a different vendor) could be used on the clients 110. Or each of the four locations 602, 604, 608, 610 could use a different database format.

Each data item 202 in the master replicas 606 and each data item 202 in the cached data 612, 614 has a corresponding tag 204. Each cache 608, 610 also contains a token 616, 618 for each of the master systems 602, 604 that holds the master replica for data items 202 in the cache 608, 610. These tokens 616, 618 are used to help synchronize the cached data 612, 614 with the master replicas 606, as explained below.

To facilitate quick cache synchronization, the system 600 uses indexed tags 204. Tags 204 stored on a given master system 602 or 604 record the most recent changes that have occurred for each data item 202 stored in that master system. For each tracked event type that can occur on data items 202 in the master system, the logging facility on the master system stores a tag 204 value equal to the highest database sequence number at the time of the event for the data item 202 being operated on. If the same event occurs on the same data item 202 at a later time, the previous tag 204 value is simply changed to the current database sequence number because only the last occurrence of the event is needed for cache synchronization.

The tags 204 are indexed to allow a quick lookup to determine what events occurred after a given database sequence number. Thus, a cache site 608 or 610 can send a request to the master system 602 or 604 to get a list of the most recent events that occurred on data items 202 since the last time the cache made an inquiry. The cache's request can specify the event types that should be returned. This allows, for example, one cache to add data items 202 to the cache each time an add event occurs while another cache may only update data items 202 in the cache when a modify event occurs.

The request from the cache 608, 610 to the master system 602, 604 can also specify the maximum number of events to return. Limiting the number of events is important because the cache may use a synchronization thread that allows its cache manager to process only a few events during each pass, thereby allowing CPU use by other processes.

The list of events returned from the master system 602, 604 can be used to determine which operations should be performed on the cache 608, 610 to bring it into sync with the master system. The following table provides an example event list returned from the master system and possible operations to perform for each returned event:

| Event List Returned from Master | | |
| --- | --- | --- |
| Event | Object | Action Performed by Cache |
| EVENT_ADD | Object 1 | read Object 1 and add it to the cache |
| EVENT_MODIFY | Object 5 | read Object 5, update it in the cache |
| EVENT_PURGE | Object 2 | delete Object 2 from the cache |
| EVENT_CHANGE_SECURITY | Object 9 | if Object 9 is in cache check if user still has rights to it. If not, remove the object from the cache. |

Each time the cache 608, 610 makes a request it is given a new token 616 or 618 representing the most recent event returned. The cache 608, 610 later uses this token 616, 618 to begin navigating the sequence of events starting from the point where the last request left off. Because the master system 602, 604 may hold multiple databases 606, each token 616, 618 is encoded with sequence numbers from each database 606 in the master system. After the cache 608, 610 successfully processes all events in the returned list, the appropriate token is stored in the cache database 612, 614, respectively, to be used for the next synchronization request.

In one embodiment, the system 600 uses a current set of tokens 616, 618 which were stored in the caches 608, 610 from the previous synchronization step 510. The caches 608, 610 send their current tokens to the master system(s) 602, 604 as part of the synchronization request(s). In response, each requested master system creates the event list and sends it back to the requesting cache. The cache manager then uses the event list to update the cached data.

One embodiment of a system 600 includes Novell GroupWise software. The system 600 allows a user (either a human or a software agent) to publish documents to the Internet from a GroupWise document management module. The system 600 automatically converts the documents from over many different file formats to HTML format. The HTML version is returned to the client 110 so it may be viewed from any HTML browser. The present invention is used to cache converted documents because the conversion stage can take more than a minute for complex documents. Each time a list of events is returned from the master system, the cache manager converts the appropriate document to HTML and stores it in the cache. The system supports multiple publishing sites (caches) such as an Internet and an intranet that service the same master systems. The master systems and their clients may use proprietary database formats, or they may use commercially available formats such as those found in Oracle databases and in the Microsoft Windows registry (trademarks of their respective owners). As noted, various databases can also be used at different sites.

Use of the invention is beneficial because a user can add a document to the GroupWise library and the document will be automatically converted and placed in the cache. Because the document will likely be added to the cache before an Internet user requests the document, the perceived access time for documents in the library is instant.

A conventional solution to this synchronization problem would send a list of objects in the cache to the master to determine which ones are out of date. The master would then compare this list with the objects in the master system and return a list of operations to perform for each object. By using the present invention, a smaller amount of data can be sent to the master to quickly determine what needs to be synchronized in the cache. In one embodiment, the system 600 allows synchronization intervals as frequent as every five seconds because the request requires minimal overhead. The conventional solution of sending a list of objects to the server requires much more time be spent compiling a list from the cache, requires much more data in the request because information about each object in the cache must be sent, and requires much more time be spent comparing objects sent from the cache with objects on the master to create a synchronization plan.

Returning now to FIG. 5, the indexed tags are also used during step 510 to create an update log used to synchronize database copies. During a step 526, the tag index 300 is used to create a dynamic update log. The dynamic update log is then used during a step 528 to synchronize two copies of the database. The copies may include replicas such as database replicas 606 stored on non-volatile media, or cached data 612, 614 stored in fast but volatile media such as RAM, or a combination thereof.

The benefits of using dynamic logs according to the invention may be understood by comparing dynamic logs with two other approaches to maintaining the information that is needed to synchronize replicas or other copies of data in a distributed database. One alternative maintains a physical log of updates instead of maintaining a dynamic log; the physical log grows on disk as updates are made to the replicas. A second alternative uses a state-based synchronization method which does not explicitly construct a log and (more importantly) detects changes by remote comparison of the database copies instead of using local update references or other tags.

The present invention differs from implementations which use physical update logs by not requiring that a physical list of update events be maintained. Instead, the tags 204 and tag indexes 300 provide sufficient information to construct a virtual log dynamically. The invention differs from implementations that use state-based synchronization by providing a log that makes synchronization possible without comparing all state information, that is, all data item 202 values.

The maintenance of a physical log poses several problems. First, the physical log requires storage space on the maintaining location. The space needed increases with the number of replica locations that must be synchronized. Second, significant computational resources are needed to maintain the log with acceptable scalability. For instance, some kind of log compression may be needed. Third, per-replica structures must be maintained within the update log for each other replica that may synchronize with the replica in question. This is necessary in order to maintain "log checkpoints" when performing compression. Such checkpoints prevent the effects of a later update from being compressed into an earlier update if the current synchronization point for a replica (the log location up to which that replica is synchronized) falls between checkpoints. This per-replica data impacts scalability in the number of replicas.

The present invention makes it possible to do without a physical log by constructing a virtual log dynamically. Each data item 202 in the database 606 has associated with it an update reference or other tag 204. Each tag 204 may be implemented as an attribute of the data item 202, or it may be associated with the data item 202 in another way, such as by a pointer or by a fixed relationship between the location of a given data item 202 and the location of that data item's tag 204. The tag is not part of the synchronized data 202; the tag 204 is only used locally.

Each tag 204 holds a value from some ordered set. In the simplest case, the tag values are simply integer values. Whenever a data item 202 is updated, the associated update reference or other tag 204 is updated to a value no smaller than the largest value currently existing in the local copy (such as 606, 612, 614) of the database. In the simplest form, this amounts to incrementing a global count and putting the incremented value in the update reference 204. Each pair of copies that are to be synchronized with respect to one another maintain between them the last update reference value each has seen from the other.

Each database replica maintains a tag index 300 into the update references 204 of its data items 202. This provides an efficient update-time ordering (partial ordering) of all data items 202 in the database on a particular replica.

In a preferred implementation, the synchronization topology is a star with one master location such as the master system 602 acting as a synchronization hub for many replica locations such as the locations 608, 610. In this case, scalability in the number of replicas may be improved by having each replica hold the latest update reference 204 which it has seen from the master system as well as the latest update reference 204 the master system has seen from that replica. This leaves the master system with no per-replica state information to maintain. These remembered update references effectively do the job of synchronization checkpoints in systems that use physical logs. After synchronization the next value used to replace an update reference 204 at the source (master) location on the next update to a data item 202 at the source should be strictly greater than the last value used, in order to avoid changes being synchronized multiple times.

In order to synchronize, a virtual update log is dynamically constructed by reading all updated data items 202 in update reference order beginning immediately after the last one that has already been seen. This update log contains complete data items 202 which may be used to replace the corresponding data items 202 (or create new ones) at the target location during synchronization.

The synchronizing step 528 may include a clash detecting step 530 to detect inconsistencies in the replicas that cannot be resolved simply by updating a data item's value. For instance, a data item 202 may have been renamed in one replica and deleted from the other replica. Suitable clash handling methods are described in commonly owned copending application Ser. No. 08/700,489 filed Sep. 3, 1996 and incorporated herein by reference.

By appropriate choice of the update reference 204 type used, a number of desirable properties may be achieved. Using a simple integer makes tags 204 relatively easy to understand and provides a measure of update order preservation. An alternative embodiment uses an integer tag 204 that is only incremented when another replica requests synchronization. Thus all data items 202 updated between particular (virtual) checkpoints have the same update reference. In effect, the update reference 204 becomes a checkpoint. This minimizes the effort needed to maintain the index 300 on the update references 202 by minimizing changes to the references 204.

Another alternative is to use tags 204 containing compound values. Such tags 204 may be used during the grouping step 532 to partition the database by using a tuple value (X, Y) as the update reference 204, where X is a partition identifier and Y is the simple update reference with the properties discussed above. The X values are assumed also to be (possibly arbitrarily) ordered and a comparison of tuples proceeds by considering the X component as the most sign could be used. For instance, this tag 204 format could be used when the database represents a file system and the partition reference identifies a subtree. This tag 204 format makes it relatively easy to keep together updates to each subtree during the synchronization process, thus promoting locality of reference which can help caching performance.

A compound tag 204 format can also be used to allow separate partitions of the database to be independently synchronized during the step 528. In this case particular attention must be paid to move or rename operations, since they can move a data item 202 between partitions. Multiple tag indexes 300 may be maintained in connection with compound tags 204 to provide further flexibility in synchronization order. For instance, some replicas may favor locality of reference while others favor selective synchronization based on event type or frequency.

The virtual dynamic log of the present invention has several advantages over a continually updated physical log. Continual logging is difficult to extend from central (star) synchronization topologies to peer-to-peer or any-to-any synchronization because of the log's role in clash handling. In resolving a clash, the replica's log is modified to generate a new non-clashing sequence (effectively rewriting history). This works because the replica only synchronizes with one master. To synchronize with several masters the replica would need to keep different logs for each master, because it may successfully synchronize an update sequence to one master but need to modify that update sequence to synchronize with another master. Keeping a different continual log for each master requires multiple physical copies. With a dynamically constructed log, this simultaneous maintenance of multiple histories is implicit in the tags 204.

For similar reasons a master continual log must maintain checkpoints across which no compression occurs. The checkpoints mark the last points seen by each replica the master will sync with. The update history must be stable across checkpoints; updates moved across checkpoints might be missed during a synchronization. The size of the continual log thus depends in part on the number of replicas -- a dependency that impairs scalability. Such checkpoints are not needed with dynamic logs because each replica gets its own virtual log, and that virtual log is suitable for the point in history at which synchronization is happening.

In addition, there is a significant performance overhead in maintaining the dependency information needed for logical compression in a continual log. This both adds to the log's storage size and reduces the update throughput. The dynamic log turns this complex activity into a relatively simple index updating activity and trades update-time overhead for a relatively small amount of sync-time overhead.

In practice a virtual log may also require less storage space than a continual log. The virtual log is only needed during synchronization. The space required by tag indexes 300 and other structures may be less than that required for dependency tracking. Also, the virtual log need not exist in its entirety in one location. The virtual log is generated by reading the database through a specialized index; the underlying data is still just the data item values. The virtual log is just an ordering of that data and never needs separate form. Likewise, reading a specific portion of the virtual log is done by filtering the database through a particular range key on the index 300 concerned, so the log doesn't have to be physically assembled in one contiguous region in memory or on disk.

The dynamic log approach adds one update reference 204 to each data item in a replica, as well as adding to each replica a partially-ordered index into the update references, and a global variable containing the value of the largest update reference currently in the replica. None of these structures are required by the continual log approach. Storage requirements for the global variable are negligible. Storage needed to hold the index depends (like storage for a continual log) on how much update activity occurs. However, the size of the tag index 300 will still be less than the size of a log for a given number of updates. Moreover, the size of the tag index 300 will only ever be proportional to the number of data items 202 in the system and in no way dependent on the number of updates it has experienced. This results in lower space requirements; one effectively gets log compression for free.

In summary, the present invention provides a novel system and method for synchronizing caches, replicas, and other copies of portions of a distributed database. The invention uses tag indexes to provide rapid and efficient access to the data items that are needed for synchronization. Methods of the invention are used for synchronizing copies of the database, such as (a) a master copy and one or more slave copies, (b) two or more copies in a peer-to-peer configuration, and (c) a master copy and one or more cached copies. A given copy may be a subset of another copy, may overlap the other copy, or may have the same extent as the other copy.

With regard to cache synchronization, benefits of the invention include the fact that a master system doesn't need to know the update policy or current state of a cache. Minimal data is stored in the cache and sent to the master system to determine what to change in the cache. Determining what to change in the cache uses a quick database lookup based on the tag index, allowing much more frequent cache synchronization. Synchronizing this cache frequently is important because the user should not perceive a difference between the cache and the master. All cache synchronization can be initiated and managed by the cache, and an unlimited number of cache sites can serve an unlimited number of master systems. In addition, data items can be added to or updated in the cache before a user requests it from the cache. This prevents the first access from incurring the cost of fetching the data item from the master at the time the user is waiting for a response from the request.

With regard to replica synchronization generally, one aspect of the invention differs from implementations which use physical update logs by removing most of the overhead and scalability problems associated with the maintenance of such logs. It also allows more flexibility in what is synchronized and in what order. The invention differs from implementations that use state-based synchronization by dramatically improving database size scalability through not having to perform remote state comparisons.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for managing a distributed database of data items, including the computer-implemented steps of associating tags with at least some of the data items in the database, the tags determining the relative order of at least two operations on data items in the database; in a local copy of the database, updating the tag for a given data item; and maintaining an index into the tags for the local copy.

2. The method of claim 1, wherein database operations are categorized by event type, and the index into the tags can be used to quickly determine what events occurred after the event corresponding to a given tag value.

3. The method of claim 2, further including the computer-implemented step of using the index to create a list of recent events.

4. The method of claim 3, further comprising the computer-implemented step of using the list of recent events to update a cache containing at least one of the database data items.

5. The method of claim 4, wherein the cache is updated in response to a request to access the cache.

6. The method of claim 4, wherein the cache is updated periodically by a cache manager, regardless of any requests to access the cache.

7. The method of claim 4, wherein the updating step comprises receiving a token from a master system, the token representing the most recent event returned from the master system during a prior cache update.

8. The method of claim 3, wherein the list of recent events is constrained by event type, so an event appears in the list only if the event is of one or more selected event types.

9. The method of claim 3, wherein the list of recent events is constrained by number, so that not more than a predetermined maximum number of events appears in the list.

10. The method of claim 1, wherein the tags are updated whenever a database operation is performed on the given data item so that each tag value is no smaller than the largest tag value currently in the local copy of the database.

11. The method of claim 1, wherein the tags are updated to reflect a database operation when another local copy of the database requests synchronization with the local copy containing the tags.

12. The method of claim 1, further including the step of using the index to create a dynamic update log.

13. The method of claim 12, further including the step of using the dynamic update log to synchronize two copies of the database with each other.

14. The method of claim 12, wherein the dynamic update log is used to handle clashes while synchronizing copies of the database.

15. The method of claim 12, wherein each tag also identifies which copy of the database the data item is located in, so that updates to a given copy can be grouped during synchronization.

16. A computer system comprising a collection of data items having associated tags for determining the relative order of two operations on a database replica, and an index into the tags.

17. The system of claim 16, wherein the data items reside in a hierarchical database.

18. The system of claim 16, wherein the data items comprise HTML documents.

19. The system of claim 16, wherein the tags include compound tags.

20. The system of claim 19, wherein each compound tag includes a database partition identifier and an update reference.

21. The system of claim 16, further comprising a synchronization means for synchronizing local copies of a database.

22. The system of claim 21, wherein the tags include compound tags and the synchronization means supports independent synchronization of separate partitions of the database.

23. The system of claim 21, wherein the synchronization means comprises means for updating a cache.

24. The system of claim 21, wherein the synchronization means comprises means for updating a replica.

25. The system of claim 21, wherein the synchronization means comprises means for creating an event list.

26. The system of claim 25, wherein the synchronization means comprises means for constraining membership in the event list.

27. The system of claim 25, wherein the synchronization means comprises means for creating a dynamic update log.

28. A computer storage medium having a configuration that represents data and instructions which will cause at least a portion of a computer system to perform method steps for managing a distributed database of data items, the method steps comprising associating tags with at least some of the data items in the database, the tags determining the relative order of operations on data items in the database; in a local copy of the database, updating a tag for a given data item; and maintaining an index into the tags.

29. The storage medium of claim 28, wherein the method steps further comprise the step of using the index to create a list of recent events.

30. The storage medium of claim 29, wherein the method steps further comprise the step of using the list of recent events to update a cache containing at least one of the database data items.

31. The storage medium of claim 28, wherein the method steps further comprise the step of using the index to create a dynamic update log.

32. The storage medium of claim 31, wherein the method steps further comprise the step of using the dynamic update log to synchronize two copies of at least part of the database with each other.

* * * * *